US006756930B1

(12) United States Patent
Nunuparov et al.

(10) Patent No.: US 6,756,930 B1
(45) Date of Patent: Jun. 29, 2004

(54) SELF-CONTAINED DIGITAL SIGNAL TRANSMITTER AND A REMOTE CONTROL SYSTEM ON ITS BASIS

(75) Inventors: Martyn Sergeevich Nunuparov, Zelenograd, 1133-159, Moscow (RU), 103460; Nikolai Mikhailovich Maslennikov, Moscow (RU)

(73) Assignee: Martyn Sergeevich Nunuparov, Moscow (RU)

( * ) Notice: Subject to any disclaimer, the term of this patent is extended or adjusted under 35 U.S.C. 154(b) by 0 days.

(21) Appl. No.: 09/830,340

(22) PCT Filed: Oct. 26, 1999

(86) PCT No.: PCT/RU99/00402

§ 371 (c)(1),
(2), (4) Date: Apr. 26, 2001

(87) PCT Pub. No.: WO00/25525

PCT Pub. Date: May 4, 2000

(30) Foreign Application Priority Data

Oct. 27, 1998 (RU) ............................................ 98119412

(51) Int. Cl.[7] .............................................. G08C 19/00
(52) U.S. Cl. .................. 341/176; 340/825.69; 323/304; 323/333
(58) Field of Search ................................ 341/176, 173; 340/825.69, 5.24, 5.33, 628, 541; 320/166; 323/304, 333, 371, 283, 282, 331

(56) References Cited

U.S. PATENT DOCUMENTS

| | | | |
|---|---|---|---|
| 3,697,975 A | * 10/1972 | Bernstein et al. | 340/310.02 |
| 3,928,760 A | 12/1975 | Isoda | |
| 3,971,028 A | 7/1976 | Funk | |
| 4,371,814 A | * 2/1983 | Hannas | 318/16 |
| 4,612,472 A | 9/1986 | Kakizaki et al. | |

(List continued on next page.)

FOREIGN PATENT DOCUMENTS

DE 40 34 100 A1 4/1992

(List continued on next page.)

OTHER PUBLICATIONS

I.P. Zherebtsov, "Fundamentals of Electronics", Leningrad. Energoatomizdat, 1989, p. 112.

(List continued on next page.)

*Primary Examiner*—Michael Horabik
*Assistant Examiner*—Hung Dang
(74) *Attorney, Agent, or Firm*—Burns, Doane, Swecker, & Mathis, L.L.P.

(57) ABSTRACT

A signal transmitting means, in particular relates to a self-contained apparatuses for transmitting digital signals and remote control systems on their basis. Said apparatuses enables the creation of self-contained digital signal transmitters with efficient circuit of supplying power from charge generators, such as piezoelectric cells, triboelectric cells or radioactive sources of charged particles, which do not need periodical replacement or recharging in contrast to traditional power sources, batteries, this in turn enabling the creation of remote control systems for electric apparatuses, data acquisition systems and warning systems with the possibility of long-term integration of remote control signal transmitters in unmanned constructions and structures. In particular, a remote control system for lighting fixtures may be designed in which wall-board switches are in the form of self-contained on/off signal transmitters for respective lighting units. To attain the technical result, a charge generator (1), when activated, generates a batch of electric charges q with high electric potential Uin, which is provided to input of a converter (2). The converter function is to significantly increase the initial magnitude of charges q to magnitude Q and store them at the converter output with potential Unot having a smaller value than Uin. Operation of a digital signal generation and transmission unit (3) is supplied by charge Q produced as the result of the conversion and provided to input of the unit (3).

13 Claims, 2 Drawing Sheets

U.S. PATENT DOCUMENTS

| | | |
|---|---|---|
| 5,012,223 A | 4/1991 | Griebell et al. |
| 5,563,600 A | 10/1996 | Miyake |
| 5,572,190 A | 11/1996 | Ross et al. |
| 5,592,169 A | 1/1997 | Nakamura et al. |

FOREIGN PATENT DOCUMENTS

| | | |
|---|---|---|
| EP | 0 011 991 A1 | 6/1980 |
| EP | 0 513 443 A1 | 11/1992 |
| GB | 2 164 219 A | 3/1986 |
| GB | 2 177 527 A | 1/1987 |
| SU | 154944 | 2/1965 |
| SU | 506038 | 3/1976 |
| SU | 1003129 | 3/1983 |

OTHER PUBLICATIONS

B.L. Alievsky et al., "Energy Storage Apparatuses", Moscow, Energoatomizdat, 1991, pp. 189–190.

F. Tenesku, R. Kramaryuk, "Static Electricity in Technology", Moscow, Energy, 1980, p. 102, Section 2–4, Frictional Electricity.

V. Ju Roginsky, "Power Supply of Radion Apparatuses", Energy, Leningrad, 1970, p. 272, Section 9–8, Atomic Batteries.

P. Bylanski and D. Ingram, "Digital Transmission Systems", Moscow, Svyaz, pp. 166, 169.

M.M. Aizinov et al., "Radio Engineering and Radio Navigation Apparatuses", Morskoi Transport Publishers, Leningrad, 1962, p. 452.

\* cited by examiner

US 6,756,930 B1

SELF-CONTAINED DIGITAL SIGNAL TRANSMITTER AND A REMOTE CONTROL SYSTEM ON ITS BASIS

FIELD OF THE INVENTION

The present invention relates to signal transmitting means, in particular to self-contained apparatuses for transmitting digital signals and remote control (RC) systems on their basis.

The invention may be used to create self-contained maintenance-free signal transmitters, beakons, signaling and transmitting devices in safety systems, wireless sensors in industrial automation systems, and remote control systems of consumer and industrial equipment.

DESCRIPTION OF THE PRIOR ART

A known self-contained coded radio-frequency signal transmitter for safety systems comprises a piezoelectric cell for generating electric charges under the application of mechanical stress thereto, a unit for generating and transmitting radio-frequency signals on air and a circuit for supplying power to said unit from the piezoelectric cell (see U.S. Pat. No. 5,572,190, published Nov. 5, 1996).

A deficiency of the known transmitter is that a relatively small electric charge generated by the piezoelectric cell when exposed to mechanical stress flows virtually unchanged to a low-frequency filter capacity which serves as a peculiar kind of buffer charge storage to supply the following unit for generating and transmitting coded radio-frequency signals. Low voltage (5–12V) at output of the low-frequency filter, suitable to supply said signal transmission unit, is generated owing to a significant voltage drop across active component of the filter, this in turn reducing the output power of the circuit. A threshold element and a silicon rectifier in this circuit affect only the shape and polarity of the current pulse from the piezoelectric cell without increasing the total charge in initial current pulse. Non-ideal nature of the silicon rectifier used in the circuit, specifically, a low diode breakdown voltage (several thousand volts) and electrical leaks from back-biased diodes, reduces a permissible operating voltage magnitude at its input and restricts thereby the possibility of obtaining sufficiently great current pulses in the circuit. As the result, the charge stored in the low-frequency filter capacity will be relatively small, this reducing efficiency of the electric supply circuit of the known radio-frequency signal transmitter as a whole.

Also known in the art are various RC devices and systems for electric apparatuses, including a lighting fixture RC system (see U.S. Pat. No. 3,971,028, published Jul. 20, 1976), a suspended fan RC system (see U.S. Pat. No. 4,371,814, published Feb. 1, 1983), TV and audio receiver RC system (see U.S. Pat. No. 3,928,760, published Dec. 23, 1975), a transmitter for a car lock RC system (see U.S. Pat. No. 5,592,169, published Jan. 7, 1997).

In particular, the car lock RC system disclosed in U.S. Pat. No. 5,592,169, comprises a self-contained coded RC signal transmitter, a receiver and a lock control unit. The receiver in the RC system receives energy from the same electric circuit as the load controlled thereby, the lock, and the self-contained RC signal transmitter is provided with an independent electric power supply, a battery or rechargeable battery.

The necessity of periodic expenditures for buying batteries, recharging rechargeable batteries and providing timely service to the self-contained transmitter, along with economic and environmental problems involved in utilization of spent batteries, are basic disadvantages of such RC systems that restrict their wide use.

Attempts have been taken to design control systems wherein a transmitter is supplied from piezoelectric cells, e.g. an electronic toy control unit (see U.S. Pat. No. 4,612,472, published Sep. 16, 1986). In the device, however, the transmitted signal has no digital coding of information which is required to control different functions of an actuator of a controlled object, and the charge from the piezoelectric cell is directly used by the transmitting apparatus without any preliminary processing, i.e. very inefficiently.

DE 4034100 teaches an apparatus for storing energy of natural lightning. The apparatus uses a reducing transformer connected, via a bridge rectifier, to a accumulation capacitor. However, the application of such design of the secondary transformer coil and the bridge rectifier is not quite efficient because, when charging the accumulation capacitor, the current pulse energy of the secondary coil is lost at two series-connected forward-biased diodes.

Furthermore, the use of natural lightning as the charge generator for compact remote control transmitters is infeasible.

Numerous documents teach various embodiments of charge generators, information generation and transmission units, and information transmission channels (see U.S. Pat. No. 5,012,223; U.S. Pat. No. 5,563,600; SU 1,003,129; GB 2164219; GB 2177527 and EPO 513443). The aforementioned documents, however, are lacking information of the possibility to use the features disclosed in them, either individually or in combination, for providing battery-free self-contained remote control signal transmitters, and information of ways of designing and technical embodiments of battery-free self-contained remote control signal transmitters and remote control systems on their basis.

The inventors are unaware of employment of piezoelectric cells or other charge generators to provide RC systems for consumer or industrial apparatuses.

SUMMARY OF THE INVENTION

The object of the present invention is to provide a self-contained digital signal transmitter which would not need periodic replacement or recharging of electric power supply, and would have an efficient circuit supplied from a charge generator, which in turn would enable the creation of RC systems for electric apparatuses, data acquisition systems and warning systems, with the possibility of long-term integration of RC signal transmitters, like traditional wallboard switches, in unmanned structures and constructions.

The above object is attained in a self-contained digital signal transmitter comprising: an electric power supply including an electric charge generator with an actuation means, and a digital signal generation and transmission unit; the signal transmitter further comprising an electric charge energy converter having an input connected to an output of the charge generator, and an output connected to an input of the digital signal generation and transmission unit; the electric charge energy converter being adapted to increase initial number of electric charges provided from the generator, and reduce potential of electric charges stored at the output of the converter.

The output of the converter may further include an electric charge storage in the form of, for example, a capacitor, for buffering the electric power from the digital signal generation and transmission unit.

In an embodiment of the self-contained transmitter, the electric charge energy converter is a reducing transformer, a primary coil of which is connected to an output of the electric charge generator, and a secondary coil comprises two coils and is connected, via a full-wave rectifier, to the electric charge storage, which is more efficient than the design of the converter taught in DE 4034100. The converter is efficient when the charge generator produces short high-energy current pulses.

In another embodiment of the self-contained transmitter, the electric charge energy converter is a semiconductor converter having an input region coupled to an output of the electric charge generator, formed by a back-biased p-n-junction and intended for storing charges from the electric charge generator and producing an avalanche breakdown process when a threshold voltage is exceeded across said p-n-junction, and an output region of the semiconductor converter, formed by a region for separating and storing secondary charges produced as the result of the avalanche breakdown, and connected, via a rectifier, to the electric charge storage. The input region of the semiconductor converter may be formed by other structures different from said p-n-junction, for example, by a transistor or thyristor structure which would provide a more pronounced electric charge avalanche multiplication process.

The self-contained transmitter may further comprise an electric charge energy converter formed by a battery of capacitors and provided with a switching device to switch the capacitors from series connection required to store charges from the charge generator, to parallel connection enabling the reduction in the charge potential at the converter output, and the use, in full measure, of the total charge stored in each capacitor separately. In this embodiment electric charge energy generated by the charge generator is used most efficiently.

The electric charge generator may be a piezoelectric cell, a triboelectric cell. It is also advantageous to use such an electric charge generator with high electric potential and practically unexhaustable capacity, as e.g. a radioactive source of charged particles which may be in the form of a capacitor, one plate of which comprises a radioactive material emitting charged β-particles, and another plate is a collector of the charged β-particles.

The latter two electric charge generators generate charges relatively slow, so the series of the described above converters may be advantageously supplemented with a short pulse former connected between the output of the electric charge generator and an input of the electric charge energy converter, said short pulse former being in the form of a gas-discharge tube, or a semiconductor threshold element, for example, a thyristor.

The digital signal generation and transmission unit in a self-contained transmitter in accordance with the invention may be adapted to transmit a radio-frequency signal, an optical signal, and an acoustic signal. In a number of systems for transmitting digital codes over great distances, the optical embodiment of the self-contained transmitter is rather efficient with the use of a laser signal emitter.

The present invention permits designing self-supporting beakons in which the electric charge generator may be a radioactive source of charged particles, so that such apparatuses may be operated, substantially service-free, in space and in marine navigation systems.

In part of a remote control system the above technical result is attained also due to the fact that in the RC system comprising an RC signal transmitter and a control unit for controlling at least one electric apparatus including a signal receiver connected with said transmitter through a communication channel, in accordance with the invention, the RC signal transmitter is a self-contained digital signal transmitter according to any one of the above-described embodiments.

The communication channel in the RC system may be provided by galvanic wire coupling, wire communication with various types of galvanic isolation, or a radio-frequency channel, an optical channel or an acoustic channel.

In the RC system, the controlled electric apparatuses may include lighting fixtures, apparatuses with an electrical actuator, home electronics apparatuses, predominantly heaters, refrigerators and air conditioners, warning and alarm apparatuses, and in particular a computer for processing and storing information received from self-contained digital signal transmitters.

An important feature of such RC system is that the RC signal transmitter may be adapted to be integrated in walls of constructions and other unmanned engineering structures, because such charge generators as, for example, piezoelectric cells, triboelectric cells, radioactive sources of charged particle do not require service such as periodic replacement or recharging of electrolytic cells.

The principle possibility of attaining the aforementioned result may be explained on the premise that the energy conservation law is observed for the conversion corresponding to the invention, which looks, in ideal form, as $q*Uin=Q*Uout$, where q and Uin are, respectively, the charge and its potential at input of the converter, and Q and Uout are, respectively, the charge and its potential at output of the converter. On the basis of this condition it may be assessed that to increase (multiply) the number of charges at the converter output, i.e. for condition $Q>q$, it is required that the potential Uin at the converter input would exceed the potential Uout at its output. Condition $Uin>Uout$ can be rather easily realized technically since the potential of charges produced by a charge generator, such as a piezoelectric cell or a triboelectric cell, is inversely related to the self-capacity or load capacity, and may reach several thousand volts, whereas the potential needed to supply circuitry of the transmitter is only a few volts. Efficiency of the charge number multiplication process will be defined by efficiency of the converter in the process of transporting the initial charge electric energy from the converter input to its output.

BRIEF DESCRIPTION OF THE DRAWINGS

The invention will become apparent from the following description of the preferred embodiments with reference to the accompanying drawings, in which.

DESCRIPTION OF THE PREFERRED EMBODIMENTS

Figure 1:
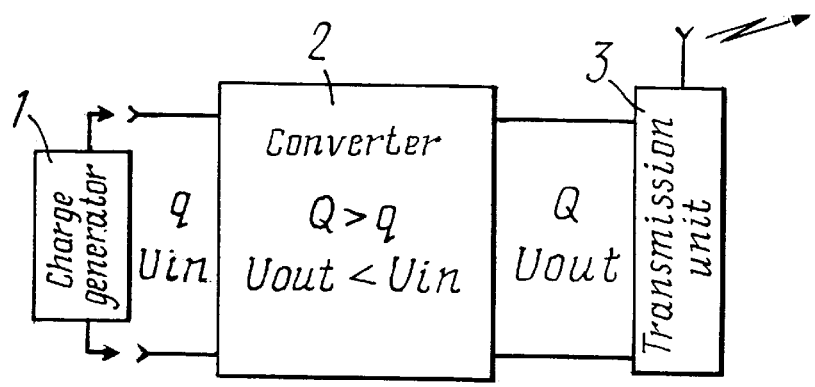
FIG. 1 shows a schematic view of a self-contained digital signal transmitter in accordance with the invention.

Referring to FIG. 1, a transmitter comprises a charge generator 1 having an output connected to an input of a charge converter 2, an output of the converter 2 being connected to an input of a digital signal generation and transmission unit 3.

As shown in FIG. 2à, the charge converter includes a transformer 4 having a primary coil 5 acting as an input of the converter, and a secondary coil 6 which is connected, via a rectifier 7, to an accumulation capacitor 8 acting as an output unit of the converter.

Figures 2A, 2B:
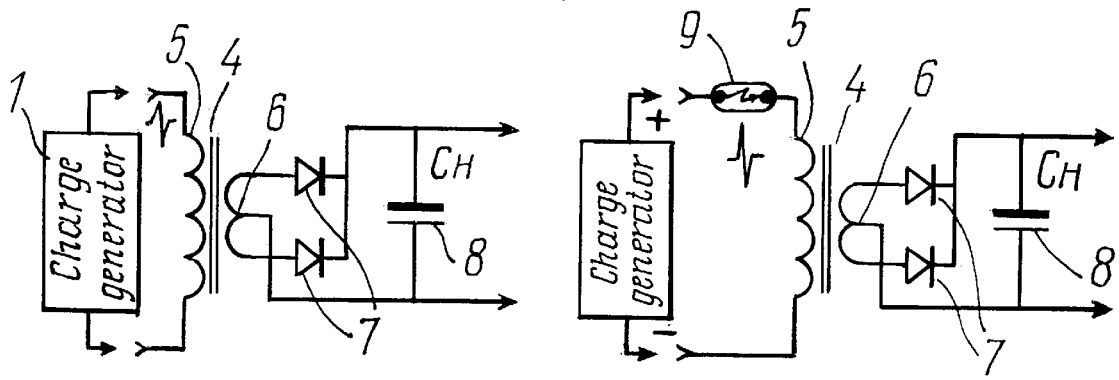
FIG. 2a shows schematic view of a converter based on a reducing transformer.
FIG. 2b shows a schematic view of a converter based on a reducing transformer with a threshold element at input.

FIG. 2b shows a charge converter configured in accordance with a circuit shown in FIG. 2à and supplemented with a threshold element 9.

Figure 3:
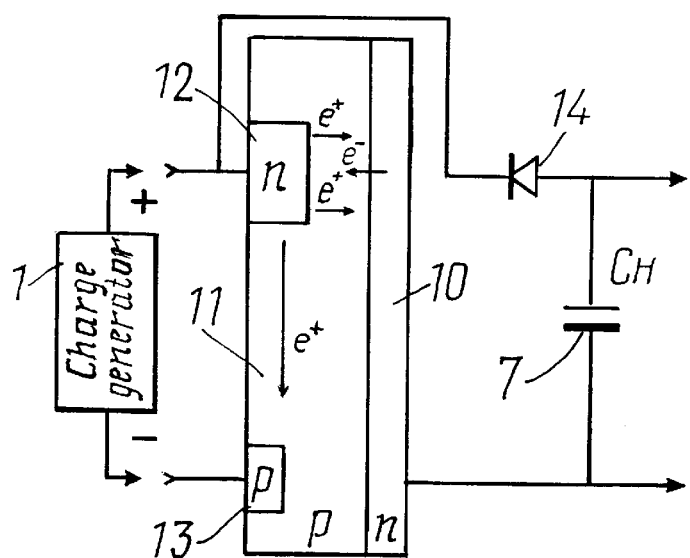
FIG. 3 shows a schematic view of a converter based on a semiconductor structure.

The converter shown in FIG. 3 is made by a semiconductor structure having n-type substrate 10 with p-type epitaxial layer 11. A rectifying contact 12 in the form of an p-n-junction, and an ohmic contact 13 are formed in the epitaxial layer 11 are. The contacts 12 and 13 form an input of the converter. The output accumulation capacitor 8 of the converter is connected by one output to the substrate 10 and by another output, via a rectifier 14, to the rectifying contact 12.

Figure 4:
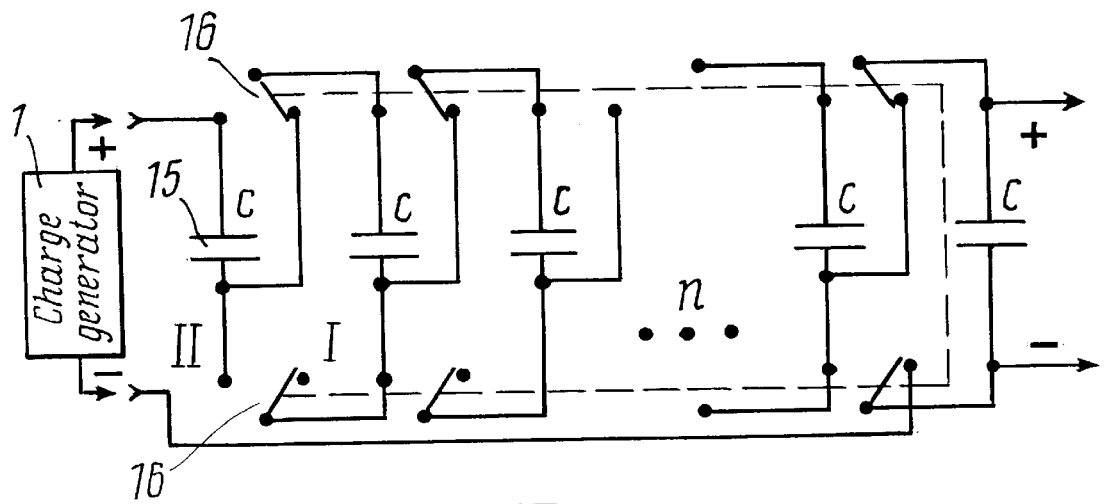
FIG. 4 shows a schematic view of a converter based on a battery of capacitors.

FIG. 4 shows a charge converter comprising a set of n identical capacitors 15, which may be transformed, using a switching unit 16, into an assembly with series connection of the capacitors when all of the switches are put in position I, or an assembly with parallel connection of the capacitors when all of the switches are put in position II.

Figure 5:
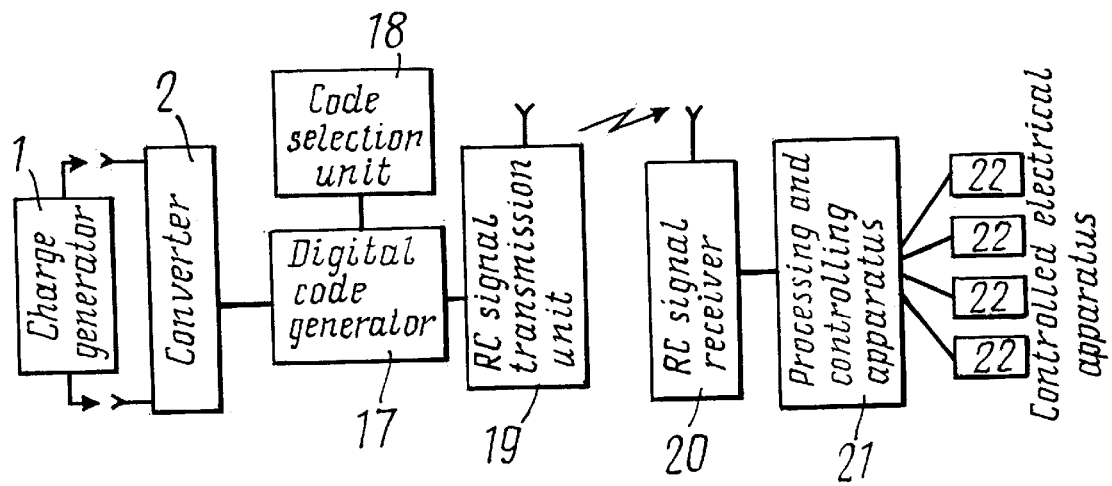
FIG. 5 shows a schematic view of a remote control system for electric apparatuses.

A schematic diagram of an electrical apparatus RC system, shown in FIG. 5, comprises a charge generator 1 having an output connected to an input of a converter 2. An output of the converter 2 is connected to an input of an electric power supply of a digital code generator 17. The generator 17 is controlled by a code selection unit 18 coupled to a respective input of the generator 17. An output of the generator 17 is connected to an input of an RC signal transmission unit 19. The components 1, 2, 17, 18 and 19 form a transmitter of the RC system. An RC signal receiver 20 is coupled by an output to an input of a processing and controlling apparatus 21 which, in turn, is connected by its outputs to inputs of controlled electrical apparatuses 22.

A transmitter, a schematic diagram of which is shown in FIG. 1, operates in the following manner.

Having been activated, the charge generator 1 generates a batch of electric charges q with high electric potential Uin, which are provided to an input of the converter 2. The converter function is to increase the initial magnitude of charges q to magnitude Q and store them at the converter output with potential Unot having a smaller value than Uin. To operate, the digital signal generation and transmission unit 3 is supplied with electric power from the charge Q produced after the conversion and provided to the input of the unit 3.

The converters shown in FIG. 2à and FIG. 2b operate in pulse mode. If activation of the charge generator 1 results in generation of a high-energy current pulse, then on providing the current pulse to the primary coil 5 of the transformer 4 an electromotive force (EMF) pulse is induced in the secondary coil 6 of the transformer 4 owing to electromagnetic transformation of the pulse energy. As the number of turns in the secondary coil 6 is smaller than that in the primary coil 5, the EMF amplitude in the secondary coil 6 will be smaller than the input voltage amplitude, and the current amplitude in the secondary coil will exceed that in the primary coil 5. Thus, the total charge Q in the secondary pulse will be greater than the charge q contained in the primary pulse emerging from the charge generator. On rectifying the secondary current pulse in the full-wave rectifier 7, its charge Q accumulates in the accumulation capacitor 8.

If activation of the charge generator 1 cannot provide a short high-energy current pulse, it is necessary to use a threshold element 9 connected in series to one of outputs of the charge generator 1 and one of outputs of the primary coil 5 of the pulse transformer 4 (FIG. 2b). In the circuit shown in FIG. 2b, a current pulse is generated in the primary coil of the transformer as the result of switching (breakdown) of the threshold element 9 when the voltage thereon exceeds a predetermined value.

The threshold element in the circuit may be a tube with a gas-discharge gap or a semiconductor structure, such as a thyristor.

The embodiment shown in FIG. 2b will be rather efficient with the charge generator 1 in the form of a triboelectric cell or a radioactive source of charged particles. In such generators, electric charge and respective potential at the generator output accumulate fairly slow.

In the embodiment shown in FIG. 3, a rectifying contact 12 comprises a back-biased p-n-junction, in the capacity of which charge q produced by the charge generator 1 accumulates. When the voltage across the p-n-junction exceeds a threshold voltage magnitude, its electric breakdown occurs accompanied by production of electron-hole pair avalanche. A part of non-equilibrium charge carriers will flow to the ohmic contact 13. However, by providing a sufficiently great resistance of the epitaxial layer 11, the electrical leak through the contact 13 may be made smaller than the electron injection current from the highly doped n-region of the substrate 10 in the vicinity of the contact 12, appearing owing to spatial redistribution of electric potentials in the structure after breakdown of the p-n-junction of the rectifying contact 12. The injection current of the substrate compensates for the current of non-equilibrium holes drifting from the contact 12 in the direction of the substrate 10, and will charge, via the rectifier 14, the accumulation capacitor 8 to charge Q. Owing to the fact that the number of non-equilibrium charges produced by the avalanche breakdown is many times greater than the charge q preliminary produced by the charge generator 1, such a semiconductor converter will operate as a multiplier of charge q. As already mentioned, the region of the p-n-junction of the contact 12 may be formed by another semiconductor structure, for example, a transistor or thyristor. A basic requirement to the structure is that its input capacity should be fairly small to enable storing the charge from the charge generator with a high potential, and after exceeding a threshold voltage, forming a structure breakdown current pulse with provision of the charge carrier avalanche multiplication process.

A converter, shown in FIG. 4, based on switching a set of elementary low-voltage capacitors 15 with capacity C implements a simple method of converting a magnitude of primary charge q generated by the charge generator 1.

With series connection of the capacitors 15 (all switches 16 set in position 1), the total input capacity of the converter is small and defined as Cin=C/n, where C is the capacity of each capacitor 15, and n is the number of capacitors 15 in the converter. If the charge generator 1 has produced a small portion of charge q, the voltage at the converter input will be great and defined as Uin=nq/C. In this case, owing to the series connection, each separate capacitor 15 will be charged with identical charge q. With subsequently setting all of the switches 16 in position II, all of the capacitors 15 are connected in parallel. The parallel connection of the capacitors 15 will have capacity Cout=nC, and the charge of this capacity will be equal to the sum of charges of all of the capacitors 15, i.e. Q=nq. Magnitude of the voltage generated at the converter output may be defined as Uout=Q/Cout=q/C=Uin/n. Therefore, the structure acts as an n-times multiplier of the charge q produced by the charge generator 1 with a simultaneous n-times reduction in its potential at the converter output.

The switches in the converter shown in FIG. 4 may be implemented both with a mechanical control, and using electronic switching means.

The RC system shown in FIG. 5 operates as follows. On activating the generator 1, its charge is provided to the converter 2 adapted to increase the initial number of electric charges and reduce potential of the electric charges accumulated at the converter output. The converted charge from the output of the converter 2 is provided to input of the code generator 17 to supply the same. The code selection unit 18 controls the generator 17 to select a respective digital code for an RC command for electric apparatuses 22. The unit 18 may be operated simultaneously with the charge generator activation. The generated digital code is provided from the generator 17 to the transmitting unit 19 which radiates a coded RC signal over a communication channel. The signal is detected by the receiving unit 20 and provided, after amplification, to the processing and controlling unit 21. In the unit 21, information is separated from the digital code of the RC signal and a control command for electric apparatuses 22 is generated.

The described embodiments of self-contained signal transmitters and remote control systems are only illustrative and by no means restrict the scope of invention defined in the claims.

Industrial Applicability

Therefore, it has been shown that an RC system may constructed in which a digital signal transmitter will be adapted to be supplied from charge generators, such as, for example, piezoelectric cells, triboelectric cells or radioactive source of charged particles.

This possibility has a qualitative effect on the technology and design of remote control systems, and opens the way to new technical solutions which do not require the application of short-lived and needing a periodic service power sources for RC signal transmitters.

For example, appearance of RC systems for lighting fixtures and other consumer apparatuses, service-free RC signal transmitters e.g. in the form of traditional switches or self-contained RC panels, at the already existing market will provide a significant economy associated with savings in service expenditures needed currently, and added consumer qualities of the goods. By way of example, it concerns such goods as garage gate consoles, flat of cottage electric bells, switches for electric equipment on holdings, laser systems for guarding perimeters of secret objects, etc.

Furthermore, RC transmitting apparatuses in accordance with invention may be integrated in walls, floor, hard-to reach places of various structures and constructions. This new quality is important in development of computerized guard system and data acquisition systems. For example, a passive data acquisition system can be designed to gather information of a number and position of cars on parkings through embedding piezoelectric radio-frequency sensors in the parking place pavement so that a car running thereon would activate a piezoelectric cell of the sensor to generate an appropriate information signal.

New potentialities appear of efficient use of radioactive power sources, on basis of which compact long-term beakons may be designed for orientation in space or mounted in marine navigation systems.

Of crucial importance is the use of RC transmitters, free of batteries and accumulators, in rescue and military techniques, this enabling the creation of energy-independent warning or control apparatuses which can be conserved for a long time and used in severe emergency conditions.

In engineering constructions, in design of new machines and mechanisms, the invention will enable the provision of wireless energy-independent sensors to simplify communication systems for automatically controlling these constructions.

What is claimed is:

1. A self-contained digital signal transmitter comprising:
   digital signal generation and transmission means having a power supply input and an output for outputting a generated digital signal to be transmitted;
   electric charge generation means for generating an electric charge with a high charge potential,
   electric charge energy conversion means for converting by increasing a magnitude of the charge produced by said generation means, and reducing the potential of said charge, and having a power supply output connected to said power supply input of said digital signal generation and transmission means.

2. The transmitter of claim 1, further comprising electric charge accumulation means for accumulating the electric charge converted by said electric charge energy conversion means.

3. The transmitter of claim 2, wherein said electric charge energy conversion means comprises a transformer having a primary coil connected to said electric charge generation means, and a secondary coil connected, via a rectifier, to said electric charge accumulation means.

4. The transmitter of claim 2, wherein said electric charge energy conversion means comprises a semiconductor converter having
   an input region in the form of a semiconductor structure adapted to store the charge generated by said electric charge generation means, and produce an avalanche breakdown when a predetermined threshold voltage is exceeded at said semiconductor structure,
   an output region in the form of a semiconductor structure adapted to separate and store secondary charges produced as the result of the avalanche breakdown,
   said input region being connected to said electric charge generation means, and said output region being connected, via a rectifier, to said electric charge accumulation means.

5. The transmitter of claim 1, wherein said electric charge energy conversion means comprises:
   a battery of capacitors,
   switching means for switching said capacitors from series connection providing accumulation, in each of the capacitors, of the charge obtained from said electric charge generation means, to parallel connection providing combining of the charges accumulated in each of said capacitors and simultaneous reduction in the potential obtained as the result of the combined charge.

6. The transmitter of claim 1, wherein said electric charge generation means is selected from the group consisting of a piezoelectric cell, a triboelectric cell, a radioactive source of charged particles.

7. The transmitter of claim 1, further comprising a short pulse forming means having an input connected to said electric charge generation means and an output connected to said electric charge energy conversion means.

8. The transmitter claim 1, wherein said digital signal generation and transmission means provides transmission of a signal selected from the group consisting of a radio-frequency signal, an optical signal, an acoustic signal.

9. The transmitter of claim 1 comprising a beakon, wherein said electric charge generation means includes a radioactive source of charged particles.

10. A remote control system comprising:
- a transmitter for generating and transmitting remote control signals:
- a control unit including a receiver for receiving the remote control signals, said control unit being connected to said transmitter through a communication channel and controlling at least one electric apparatus in accordance with digital information contained in the remote control signals;
- said transmitter being a self-contained digital signal transmitter comprising:
  - digital signal generation and transmission means having a power supply input and an output for outputting a generated digital signal to be transmitted,
  - electric charge generation means for generating an electric charge with a high charge potential,
  - electric charge energy conversion means for converting by increasing a magnitude of the charge generated by said generation means, and reducing the potential of said charge, and having a power supply output connected to said power supply input of said digital signal generation and transmission means.

11. The system of claim 10, wherein said transmission channel is selected from the group consisting of a wire line, a radio-frequency channel, an optical channel, an acoustic channel.

12. The system of claim 10, wherein said at least one electric apparatus is selected from the group consisting of lighting fixtures, apparatuses with a controlled electrical actuator, warning and alarm apparatuses, computers for processing and storing information of received digital signals, home electronics apparatuses such as heaters, refrigerators, air conditioners.

13. The system of claim 10, wherein said remote control signal transmitter is adapted to be integrated in walls of constructions and other unmanned engineering structures.

* * * * *